(12) United States Patent
Moner

(10) Patent No.: US 6,213,149 B1
(45) Date of Patent: Apr. 10, 2001

(54) IN-LINE DIVERSION VALVE WITH FLOW-THROUGH CAPABILITY

(75) Inventor: Ronald A. Moner, Twinsburg, OH (US)

(73) Assignee: Parker-Hannifin Corp., Cleveland, OH (US)

( * ) Notice: Subject to any disclaimer, the term of this patent is extended or adjusted under 35 U.S.C. 154(b) by 0 days.

(21) Appl. No.: 09/374,353

(22) Filed: Aug. 13, 1999

Related U.S. Application Data

(60) Provisional application No. 60/140,004, filed on Jun. 18, 1999.

(51) Int. Cl.[7] .................................................... F16K 37/00
(52) U.S. Cl. ................................. 137/556.3; 137/625.24; 251/310
(58) Field of Search ...................................... 251/309, 310, 251/311; 137/553, 556, 556.3, 625.24, 625, 625.18, 625.19, 625.17

(56) References Cited

U.S. PATENT DOCUMENTS

| | | | |
|---|---|---|---|
| 2,185,796 | * 1/1940 | McInnis et al. | 137/266 |
| 3,079,088 | 2/1963 | Hermann et al. . | |
| 3,552,434 | 1/1971 | Haenky . | |
| 3,628,568 | 12/1971 | Green . | |
| 3,630,231 | 12/1971 | Miller . | |

(List continued on next page.)

FOREIGN PATENT DOCUMENTS

| | | |
|---|---|---|
| 19 37 840 | 2/1971 | (DE) . |
| 0 218 481 B1 | 1/1992 | (EP) . |
| 0 750 155 A1 | 12/1996 | (EP) . |
| 2 559 546 | 8/1985 | (FR) . |
| 2 768 481 | 3/1999 | (FR) . |
| WO 97/34096 | 9/1997 | (WO) . |
| WO 98/49484 | 11/1998 | (WO) . |

OTHER PUBLICATIONS

Copy of the International Search Report filed in PCT/US99/18432 entitled "In–Line Diversion Valve With Flow Through Capability" corresponding to the above US application.

Dae Wyung Chemical Co,., Ltd., portion of brochure for Fittings, dated May 10, 1999.

Page from Water Technology Magazine, issue May, 1999, showing ad for EX Faucet Adapter of G. A. Murdock, Inc.

Page from Water Technology Magazine, issue Apr., 1997, showing ad for Mur–lok R/O Pal of G.A. Murdock, Inc.

Page from Water Technology Magazine, issue May, 1999, showing ad for "A Cut Above the Rest" of QMP, Inc.

*Primary Examiner*—Kevin Lee
(74) *Attorney, Agent, or Firm*—John A. Molnar, Jr.

(57) ABSTRACT

An in-line diversion valve including a body and a plug assembled with the body. The body has an annular run extending axially from a first end opening configured to define a first port to a second end opening, and at least one annular branch extending radially from the run to a third end opening configured to define a second port of the valve. The plug extends coaxially with the body run from a first end received internally therewithin to a second end which extends externally beyond the body second end opening and which is configured to define a third port aligned coaxially with the first port. The plug is rotatable within the body and is formed as having a first passageway extending through the first and second ends thereof, and at least one perpendicular second passageway. The first passageway defines with the first and the third port a first fluid flow path, with the second passageway communicating with the first passageway in defining with the first fluid flow path and the second port a second fluid flow path. The second end of the plug is hand-accessible for the rotation of the plug between a first angular position wherein the second passageway is aligned coaxially with the body branch to open the second fluid flow path, and a second angular position wherein the second passageway is angularly displaced relative to the branch to close the second fluid flow path.

14 Claims, 9 Drawing Sheets

U.S. PATENT DOCUMENTS

| | | |
|---|---|---|
| 3,896,842 | 7/1975 | Cole . |
| 3,941,145 | 3/1976 | Morain et al. . |
| 3,974,848 | 8/1976 | Wheatley . |
| 4,043,337 | 8/1977 | Baugher . |
| 4,177,832 | 12/1979 | Price . |
| 4,240,767 | 12/1980 | Gracia . |
| 4,703,956 | 11/1987 | Keech . |
| 4,722,560 | 2/1988 | Guest . |
| 4,809,949 | 3/1989 | Rakieski . |
| 4,832,083 | 5/1989 | Bruner . |
| 4,887,644 | 12/1989 | Jeromson et al. . |
| 5,234,193 | 8/1993 | Neal, Jr. et al. . |
| 5,269,344 | 12/1993 | McHugh . |
| 5,293,903 | 3/1994 | Appelwick . |
| 5,435,337 | 7/1995 | Kemp . |
| 5,690,135 | 11/1997 | Dehais . |
| 5,701,934 | 12/1997 | Kuran et al. . |

* cited by examiner

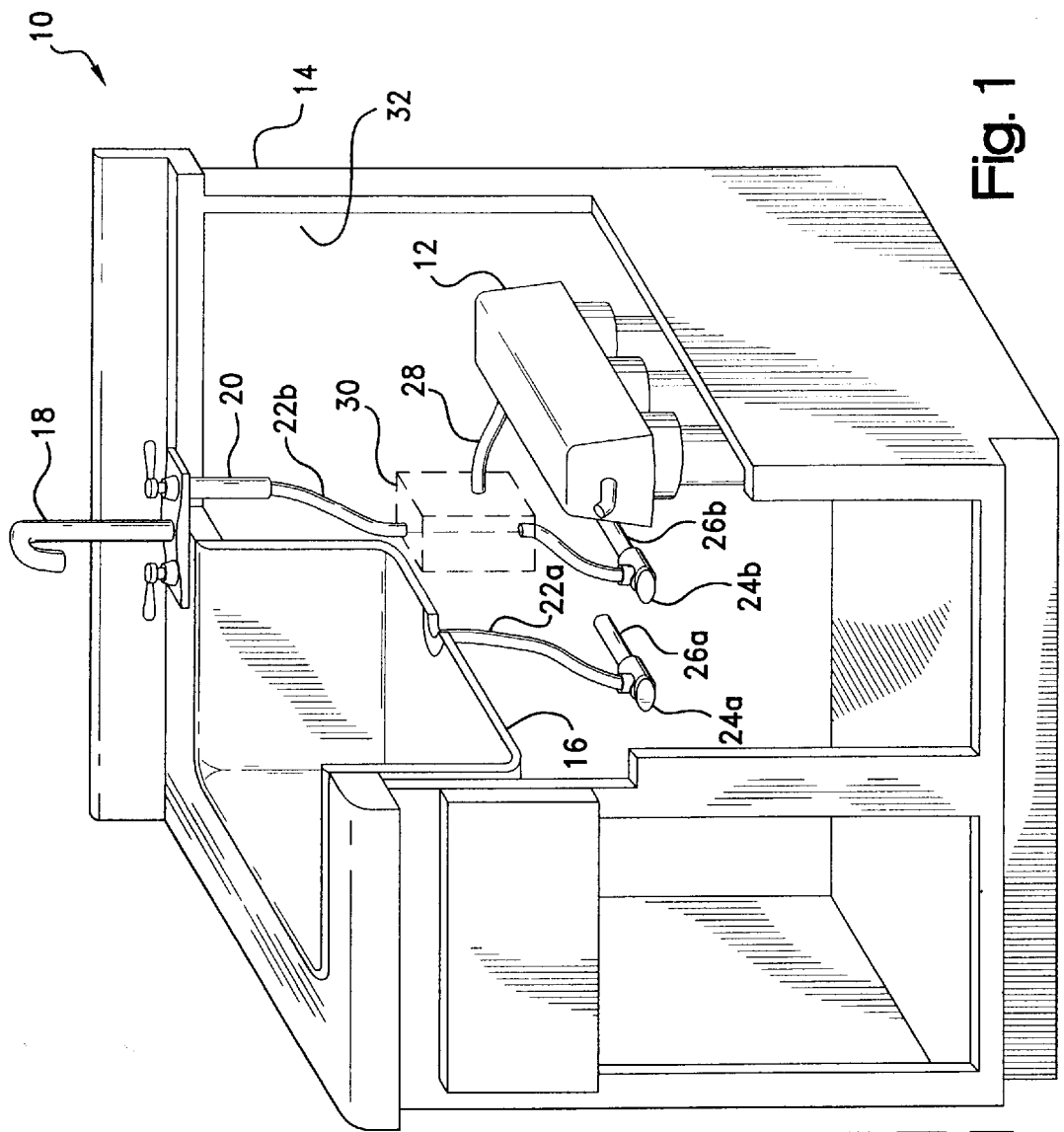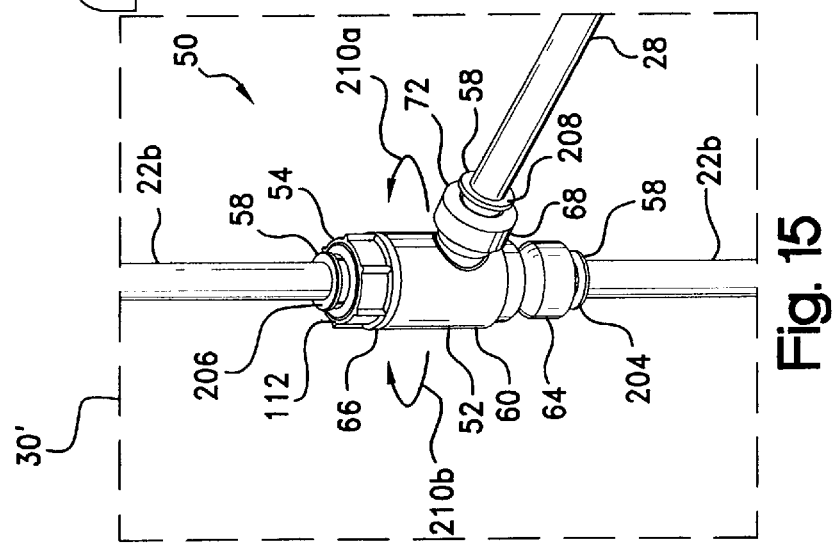

IN-LINE DIVERSION VALVE WITH FLOW-THROUGH CAPABILITY

RELATED CASES

The present application claims priority to U.S. Provisional Application Ser. No.60/140,004; filed Jun. 18, 1999.

BACKGROUND OF THE INVENTION

The present invention relates broadly to diversion valves, and more particularly to an in-line, three or more way diversion valve which is of a compact, generally tee-shaped design and which has a flow-through capability especially adapted for point of use residential or commercial water purification systems in allowing a constant flow through the valve run for connection to the water supply line and an interruptible flow to one or more branches for connection to the purification unit.

Potable water purification systems are becoming increasingly popular as point of use (POU) installations. As may be seen with reference to FIG. 1, wherein a representative one such POU installation is illustrated in cut-away perspective at 10, the purification unit, 12, which may be, for example, of a reverse osmosis or multi-bank filtration variety, typically is located within the interior of a cabinet, 14, which supports a sink bowel, 16, and an associated faucet, 18. Faucet 18 includes a pair of downwardly-depending stands, one of which is referenced at 20, configured for a threaded, typically ⅜-inch connection with an end of one of a pair of supply tubes, 22a–b, which may be copper or plastic tubing, or vinyl or braided steel hose. The other end of each of supply tubes 22 is connected to either a hot or a cold shut-off valve, 24a–b, respectively, which admits water flow from an associated hot or cold supply line, 26a–b, respectively. Water is supplied to purification unit 12 via a separate branch tube, 28.

Conventionally, and as is described further in U.S. Pat. No. 5,293,903, the connection, referenced in phantom at 30, of branch tube 28, to the cold supply tube 22b is effected by breaking the tube with a tee fitting, the branch of which fitting is connected to a shut-off valve which may be separate or integral with the fitting. Such a connection 30 allows for water flow to be maintained to the faucet 18 through the in-line "run" of the tee with the flow to the purification unit 12 through the orthogonal tee branch being separately controllable. In this regard, with the water supply to the purification unit 12 being closed, the sink thereby remains available for use in cleaning the filters, cartridges, or the like of the unit. In alternative arrangements, tube 22b may be tapped with a piercing or non-piercing saddle valve, or the connection 30 may be made directly to the faucet stand 20. Representative valves and fittings of the type herein involved are disclosed, for example, in U.S. Pat. Nos. 3,552,434; 3,630,231; 3,628,568; 3,896,842; 3,941,145; 3,974,848; 4,177,832; 4,703,956; 4,809,949; 4,832,083; 4,887,644; 5,234,193; 5,269,344; 5,293,903; 5,435,337; and 5,690,135, European Pat. Nos. EP 218,481 and 750,155, and International Pat. Application (PCT) Nos. WO 97/34096 and 98/49474, and are manufactured commercially by Dae Myung Chemical Co., Ltd. (Inchon, Korea); QMP, Inc. (Sun Valley, Calif.), G. A. Murdock, Inc. (Madison, S. Dak.), Mazzer Industries, Inc. (Rochester, N.Y.), SMC Corporation (Tokyo, Japan), and the Parflex Division of Parker-Hannifin Corporation (Ravenna, Ohio).

It will be appreciated, however, that the available clearance within the interior of the cabinet 14 is limited by the cabinet back wall, 32, and, in retrofit installations, by the sink bowel 16. Thus, the installation and removal of tee and valve assemblies having a relatively large envelope and, for threaded connections, angular displacement, is often timing consuming for the installer who typically is not a skilled plumber. Indeed, the installation of fitting and valves having threaded connections is further complicated by the need to maintain a specific orientation of the tee branch and valve relative to the purification unit.

In view of the foregoing, it is believed that improvements in the design of valves and connections for POU water purification systems would be well-received by manufactures and consumers alike. Especially desired would be a diversion valve construction which is both inexpensive and install, and which provides reliable operation.

SUMMARY OF THE INVENTION

The present invention is directed broadly to a diversion valve, and more particularly to an in-line, three or more way diversion valve which is of a reliable and compact, generally tee-shaped design. In having a flow-through capability, the diversion valve of the present invention is especially adapted for residential or commercial POU water purification systems in allowing for a constant flow through the in-line "run" of the valve for connection between the water supply line and the faucet, and an interruptible flow through one or more branches for connection between the water supply line and one or more purification units. Advantageously, the handle or knob of the valve is integrated into the in-line run of the valve to maintain a reduced envelope size as compared to conventional assemblies.

In basic construction, the valve of the present invention includes a body and a generally cylindrical plug which is assembled with the body. The body is provided as having a generally-annular run portion and at least one generally-annular transverse or branch portion. The body run portion extends axially along a first axis from a first end opening configured to define a first fluid port of the valve to a second end opening. The body branch portion extends radially from the run portion intermediate the first and the second end opening along a second axis disposed generally perpendicular to the first axis to a third end opening configured to define a second fluid port of the valve. The plug, in turn, is provided as extending coaxially with the run portion of the body along the first axis thereof from a first end received internally within the body intermediate the first and the third end opening thereof to a second end which extends externally beyond the body second end opening and is configured to define a third fluid port of the valve which is aligned coaxially with the first fluid port.

The plug is rotatable within the body about the first axis thereof and is formed as having a first fluid passageway extending coaxially with the first axis through the internal and the external end, and at least one second fluid passageway extending therein along a third axis disposed generally perpendicular to the first axis. The first fluid passageway defines with the first and the third fluid port a first fluid flow path through the valve, with the second fluid passageway communicating with the first fluid passageway in defining with the first fluid flow path and the second fluid port a second fluid flow path through the valve. For directing the flow of water or other fluid through the valve body, the second end of the plug is hand-accessible for the rotation of the plug between a first angular position wherein the third axis of the second fluid passageway is aligned coaxially with the second axis of the body transverse portion to open the second fluid flow path, and a second angular position wherein the third axis is angularly displaced relative to the second axis to close the second fluid flow path.

In a preferred embodiment, at least the second fluid port of the valve plug is adapted for a releasable, push-in connection with a distal tube end which may be presented from a length of copper, plastic, or other tubing, or, alternatively, from a fitting adapter having a proximal end which is connected to a length of braided hose or the like. In this regard, the plug is configured as having an internal gland defined within the second end thereof the plug coaxially with the first fluid passageway. The gland, in turn, is configured is to receive an annular collet which extends coaxially with the first axis from an internal end journaled within the gland to an external end. The collet is slidably movable within the gland intermediate a rearward position accommodating a radial outward expansion of the collet member for the insertion and removal of the tube end therethrough and an axially spaced-apart forward position effecting the radially inward contraction of the collet member about the tube end delimiting the removal thereof from the collet. The plug thus is rotatable about the collet and the tube end when the tube end is connected to the second fluid port by the collet member.

In an particularly preferred embodiment, the first and third posts similarly are adapted for a releasable, push-in connection with a corresponding distal tube end. In such an arrangement, the valve easily may be spliced into an existing line for retrofit installations. With the first and second ports connected to their respective tubing ends in the manner described, the valve also may be swiveled 360° to facilitate the connection of the third port to the branch line.

The present invention, accordingly, comprises the apparatus possessing the construction, combination of elements, and arrangement of parts which are exemplified in the detailed disclosure to follow. Advantages of the invention includes a plug valve construction wherein the actuation handle or knob is integrated into the valve plug in a compact, in-line arrangement. Additional advantages include a simple and reliable two-piece construction which is economical to manufacture and assemble, and which may be molded entirely of a thermoplastic material such as polypropylene, polyvinyl chloride, acetal, or polyethylene terephthalate which is approved for potable water use. Still further advantages include a valve construction which is adaptable for push-in tubing connections for easy installation even in retrofit applications. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein:

FIG. 1 is a plan view of a typical point of use (POU) water purification system;

FIG. 14 is perspective view of the clip of the valve assembly of FIG. 2; and

FIG. 15 is a perspective view showing the installation of the valve of FIG. 2 within the system of FIG. 1.

Figure 2:
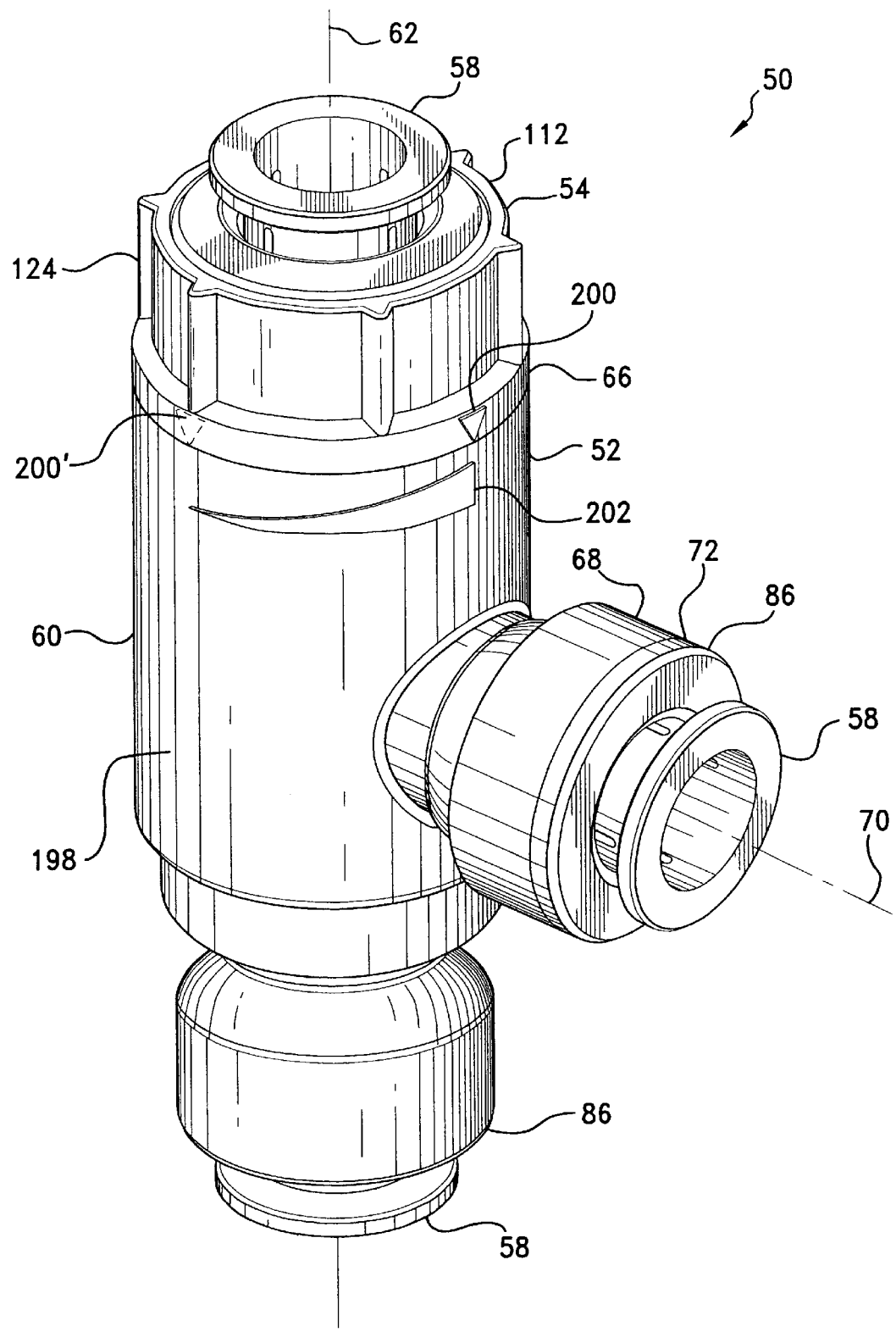
FIG. 2 is a right-side perspective view of a representative in-line flow-though valve assembly according to the present invention which includes a body, a rotatable plug, and a fastening clip for securing the plug within the body.

The drawings will be described further in connection with the following Detailed Description of the Invention.

DETAILED DESCRIPTION OF THE INVENTION

Certain terminology may be employed in the following description for convenience rather than for any limiting purpose. For example, the terms "forward," "rearward," "right," "left," "upper," and "lower" designate directions in the drawings to which reference is made, with the terms "inward," "inner," or "inboard" and "outward," "outer," or "outboard" referring, respectively, to directions toward and away from the center of the referenced element, the terms "radial" and "axial" referring, respectively, to directions or planes perpendicular and parallel to the longitudinal central axis of the referenced element, and the terms "downstream" and "upstream" referring, respectively, to locations relative to the fluid flow. Terminology of similar import other than the words specifically mentioned above likewise is to be considered as being used for purposes of convenience rather than in any limiting sense.

For the purposes of the discourse to follow, the precepts of the flow valve of the present invention are described in connection with a configuration which is particularly adapted for push-in tubing connections within a point of use (POU) water purification installation such as that shown in FIG. 1. It will be appreciated, however, that aspects of the present invention may find application in other fluid systems and which may involve threaded or other connections. Use within those such other applications and with such other connections therefore should be considered to be expressly within the scope of the present invention.

Figure 3:
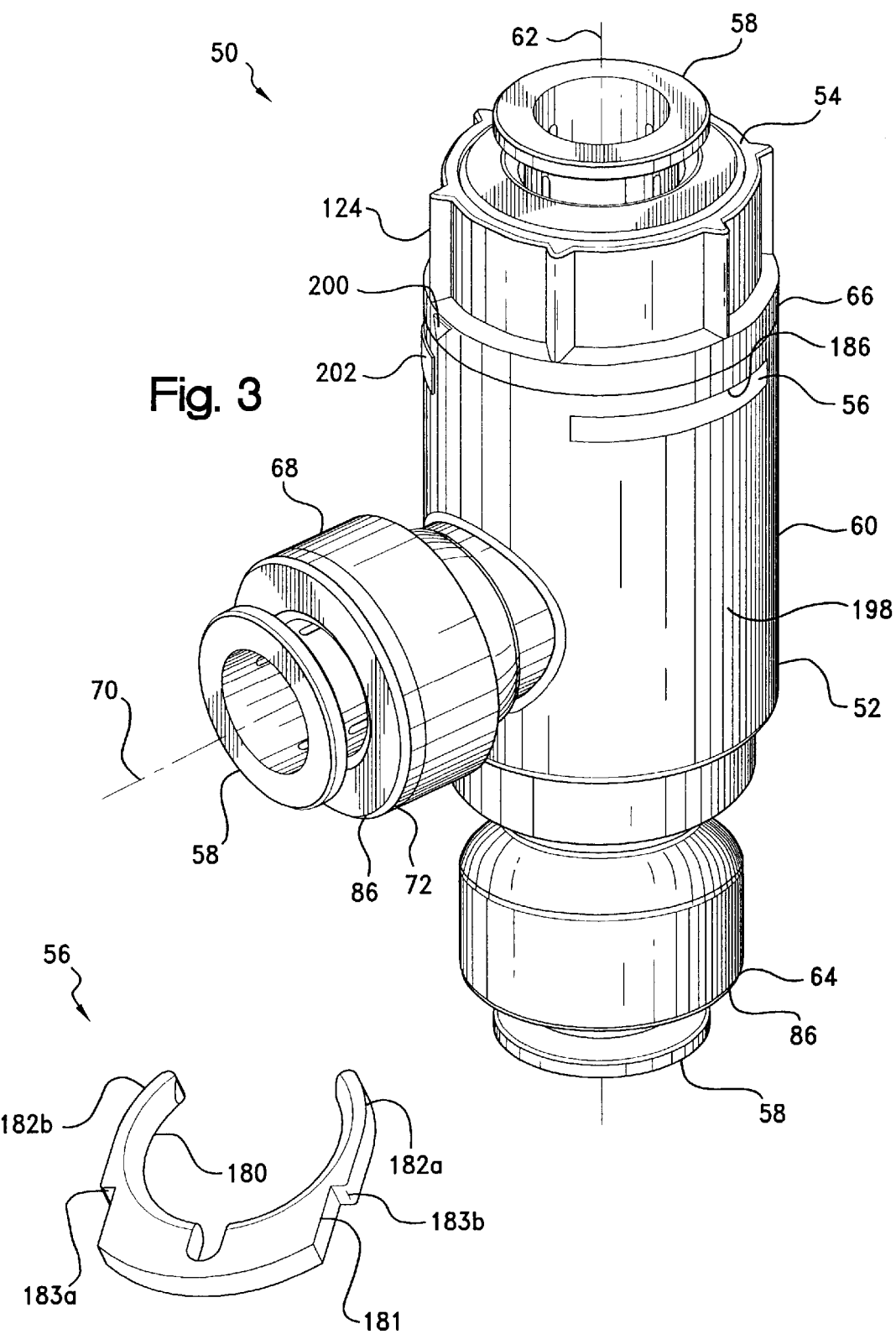
FIG. 3 is a left-side perspective view of the valve assembly of FIG. 2 showing the location of the fastening clip.
Figure 4:
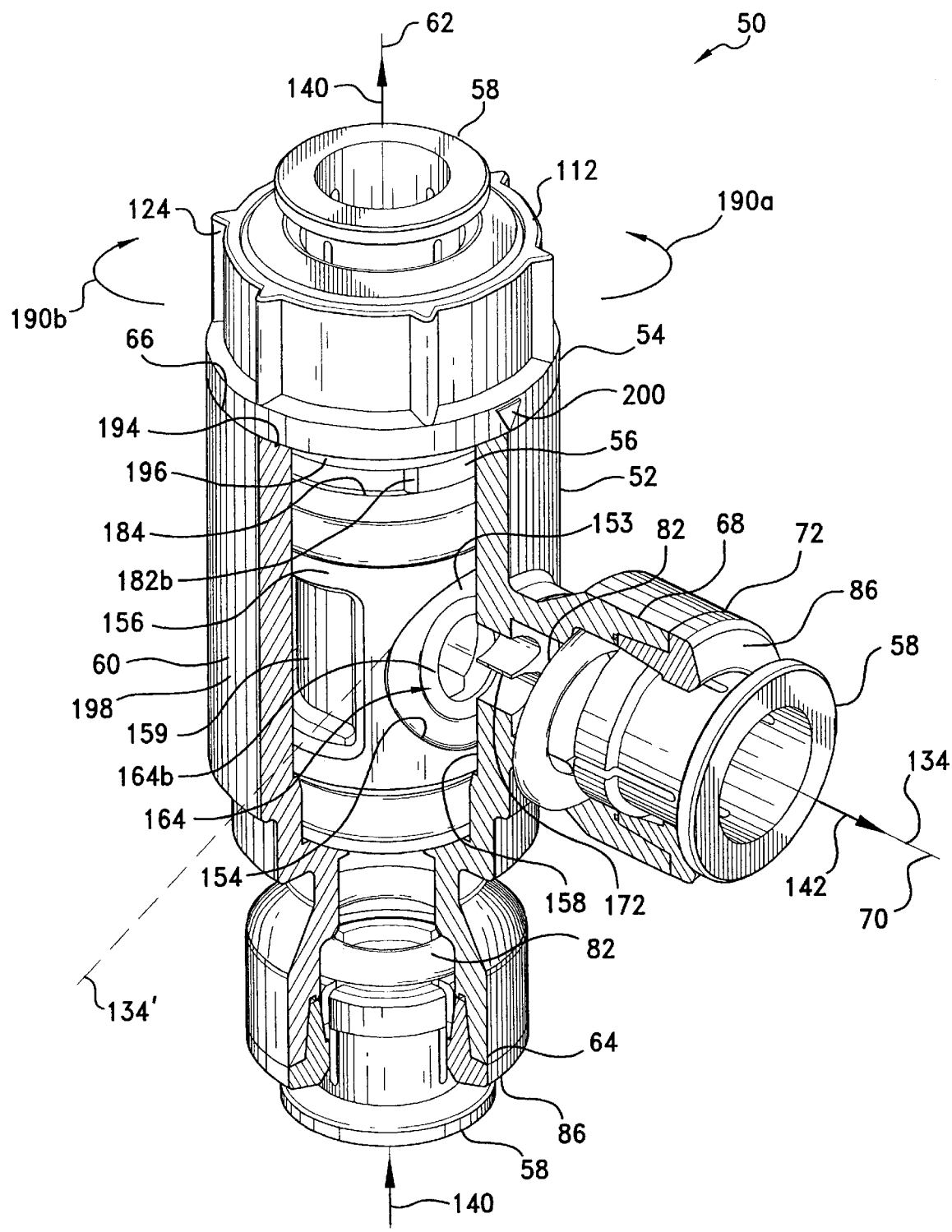
FIG. 4 is a cut-away perspective view of the valve assembly of FIG. 2.

Referring then to the figures, wherein corresponding reference numbers are used to designate corresponding elements throughout the several views, with equivalent elements being referenced with prime designations, a valve assembly in accordance with the present invention is shown generally at 50 in the perspective views of FIGS. 2–4. In basic construction, valve assembly 50 includes a tubular, generally tee-shaped body member, 52, a generally cylindrically-shaped plug member, 54, received for rotation within the body 52, and a fastening clip, 56, seen best in the views of FIGS. 3 and 4, which secures the plug member 54 rotatably within the body member 52. For effecting push-in tubing connections within, for example, the purification system 10 of FIG. 1, valve assembly 50 additionally may include a collet member, referenced collectively at 58, for each of the connections.

Figure 6:
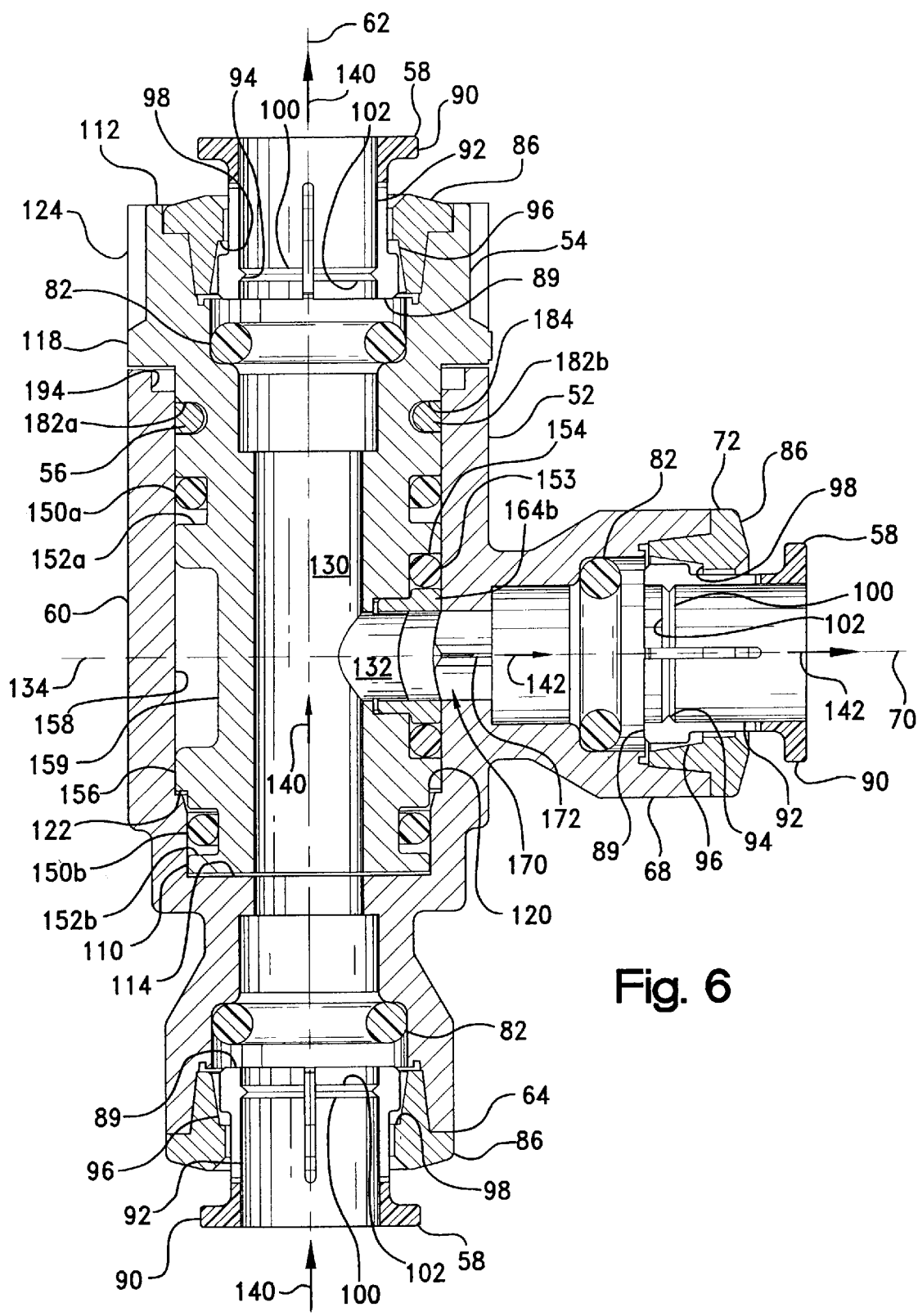
FIG. 6 is a cross-sectional view of the valve assembly of FIG. 2 taken through line 6—6 of FIG. 5.
Figure 7:
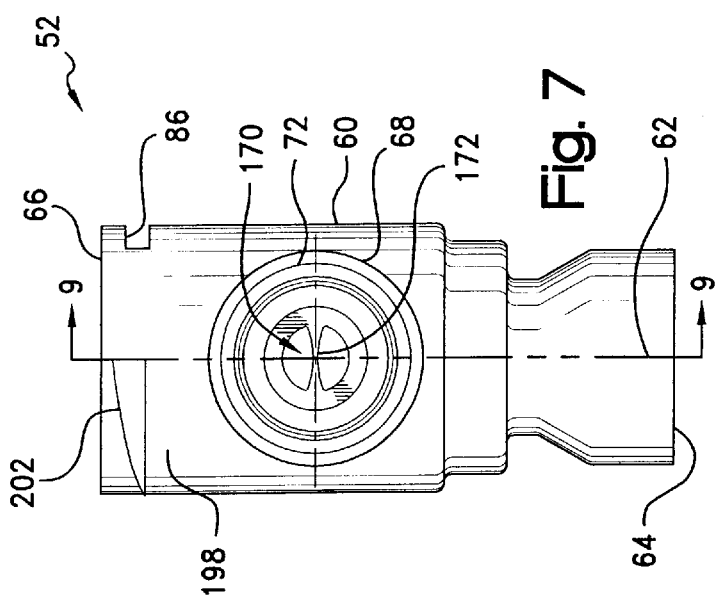
FIG. 7 is a front view of the body of the valve assembly of FIG. 2.
Figure 8:
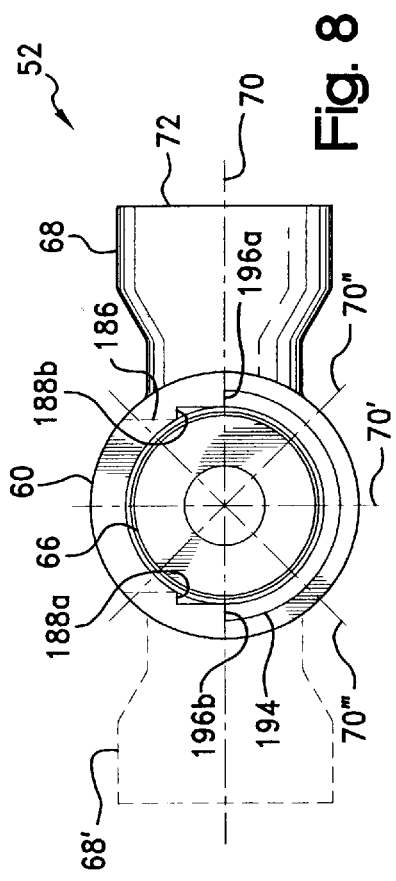
FIG. 8 is a top view of the valve body of FIG. 7.
Figure 9:
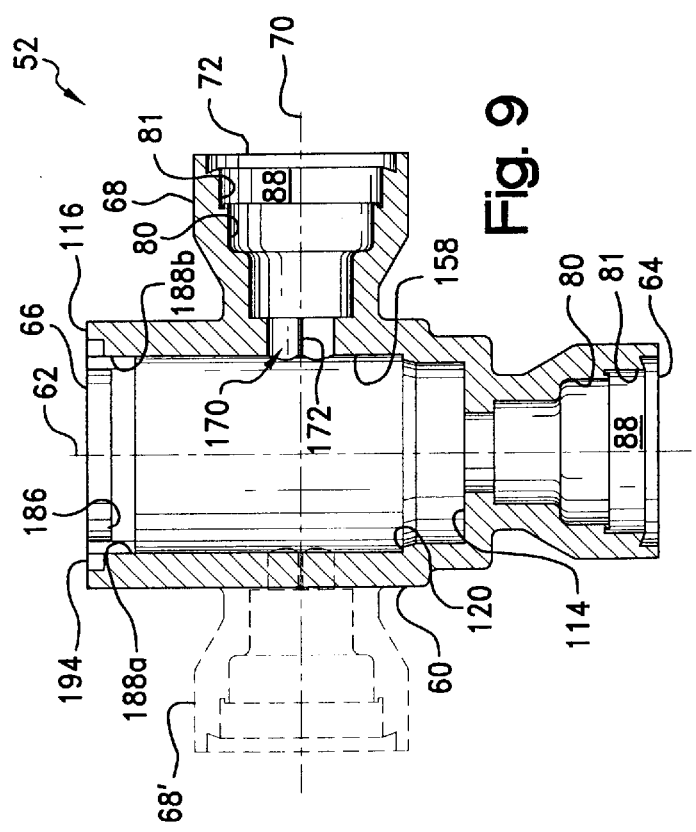
FIG. 9 is a cross-sectional view of the valve body of FIG. 7 taken through line 9—9 of FIG. 7.

Looking now to the cross-sectional view of FIG. 6, and with additional reference to the multi-view projections of FIGS. 7–9, body member 52 may be seen to be molded, machined, or otherwise formed as having a generally-annular run portion, 60, which extends axially along a first axis, 62, from a first end opening, 64, configured to define a first fluid port of valve 50, to a second end opening, 66. At least one generally-annular transverse or branch portion, 68, is formed to extend radially from the run portion 60 intermediate the first and said second end openings 64 and 66 thereof along a second axis, 70, disposed generally perpendicular to first axis 62, to a third end opening, 72. Third end opening 72 is configured similarly to the first end opening 64 in defining a second fluid port of valve 50. Depending upon the number of branch connections required for the particular application envisioned, body member 52 may be formed as having additional branch portions 68, one of which is shown in phantom at 68' in FIGS. 8 and 9 as extending along axis 70 opposite branch 68. Other branches, not shown, may be formed along, for example, the radial axes 70', 70'' and 70''' which are referenced in the top view of FIG. 8 as disposed angularly relative to second axis 70. With such additional branch portions 68, valve 50 may be provided as having a multi-way flow directing or diversion capability.

As may be seen in FIG. 9 with additional reference to the assembly view of FIG. 6, each of the body first and third end openings 64 and 72 may be formed for a tubing connection as having an internal groove, 80, and an adjoining step, 81. Each groove 80 is configured to receive an associated o-ring or other annular seal member, 82 (FIG. 6), through which the tubing end is inserted to effect a fluid-tight sealing thereof. In turn, each step 81 is configured, to receive an associated insert, 86 (FIG. 6), which in the case of a thermoplastic material of construction may be ultrasonically welded therein. Such an arrangement facilitates the manufacturing of body 52 by molding or otherwise.

With the inserts 86, the body end openings 64 and 72 each define an internal gland, 88, configured to coaxially receive a rearward end, 89, of an associated collet member 58 which further has an externally-disposed forward end, 90. As is conventional in the art of push-to-connect tube fittings, the rearward end 89 of each collet member 58 is divided into a plurality of arcuate segments, one of which is referenced at 92, for the resilient expansion of the inner diameter thereof to receive the distal end of length of tubing (not shown) therethrough. Each of these segments, as is shown for segment 92, terminates at a distal end having a radially inwardly extending, wedge-shaped projection or "grip edge," 94, and an outer surface or shoulder defining a bearing surface, 96, of an enlarged outer diameter for operative engagement with a corresponding internal camming surface, 98, of insert 86. Each grip edge 94 may be formed by the intersection of a forwardly and a rearwardly presenting inclined surface, 100 and 102, respectively, the forward surface exhibiting a camming function with an appropriately sized tubing end effecting a radially outward expansion of the collet segments for the insertion of the tubing. That is, collet member 58 may be resiliently enlarged by about 5–10% or more from its normal or relaxed inner diameter, to an expanded inner diameter accommodating the insertion and releasable capture of a corresponding tubing end through, respectively, the body end openings 64 and 72.

Within each gland 88, the collet rearward end 89 is slidably movable axially for the disposition of the collet at a rearward position wherein the collet forward end 90 is urged toward the insert 86 which may serve as a stop, and a forward position which is spaced-apart axially from the rearward position 80 to define a collet travel or rise length. In operation, collet member 58 may be advanced manually to its rearward position wherein the internal rearward end 89 of the collet is positioned within the gland 88 accommodating the radial outward movement of the segments 92 resiliently expanding the inner diameter thereof both for the insertable connection and for the removable disconnection of the tubing end. Alternatively, with collet member 58 advanced to its forward position responsive to the pressurization of the tubing, or to the application of a forwardly-directed tensile force, the collet internal rearward end 89 is positioned within the gland 88 such that the bearing surface 96 of the collet segments 92 are urged into an abutting, force-transmitting engagement with the insert internal camming surface 98 transferring a radially inwardly directed normal force component to the collet member projections 94. Such force transfer energizes the collet member 58 by effecting the tightening of the "grip" or compression thereof about the outer diameter of the tubing and the partial penetration of the collet segment projections thereinto. In this way, the removal of the tubing from the body end openings 64 and 72 thereby is delimited, with a fluid-tight seal being effected by the insert.

Push-in tubing connections of the type herein involved are described further in U.S. Pat. Nos. 3,653,689; 3,999,783; 4,005,883; 4,009,896; 4,059,295; 4,111,575; 4,178,023; 4,302,036; 4,335,908; 4,573,716; 4,600,223; 4,606,783; 4,637,636; 4,645,246; 4,650,529; 4,657,286; 4,722,560; 4,770,445; 4,804,213; 4,884,829; 4,923,220; 4,946,213; 5,024,468; 5,046,763; 5,230,539; 5,303,963; 5,314,216; 5,330,235; 5,370,423; 5,401,064; 5,437,483; 5,439,258; 5,443,289; 5,468,027; 5,511,830; 5,584,513; 5,607,193; and 5,683,120; and in U.K. Pat. No. 1,602,077. Of course, other end connections which may be of a push-in or other type may be employed without departing from the scope of the present invention. In this regard, other connections of the push-in type include a variety having a grab ring formed of a plurality of resilient fingers for gripping the tubing which is employed with a release sleeve slidably interposable between the fingers and the tubing outer wall for releasing the tubing from the fitting. Conventional threaded pipe or compression connections also may be substituted, as well as welded or adhesively-bonded connections where reuse of the fitting is not anticipated.

Figure 11:
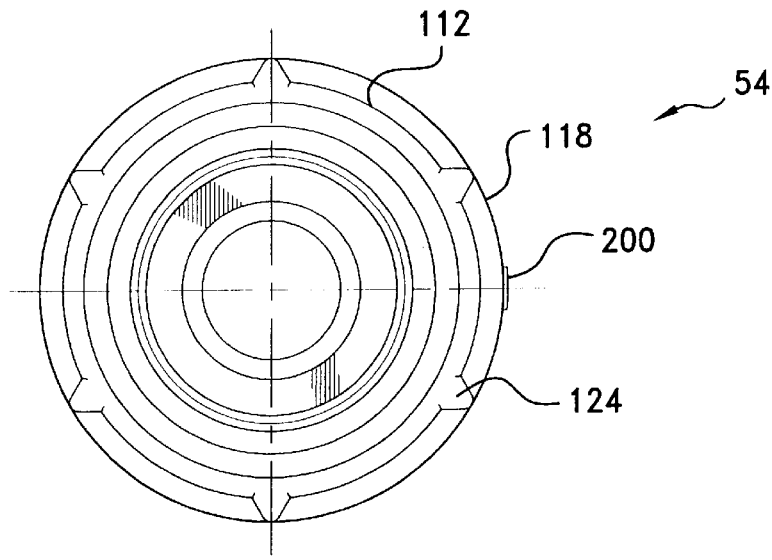
FIG. 11 is a top view of the valve plug of FIG. 10.
Figure 10:
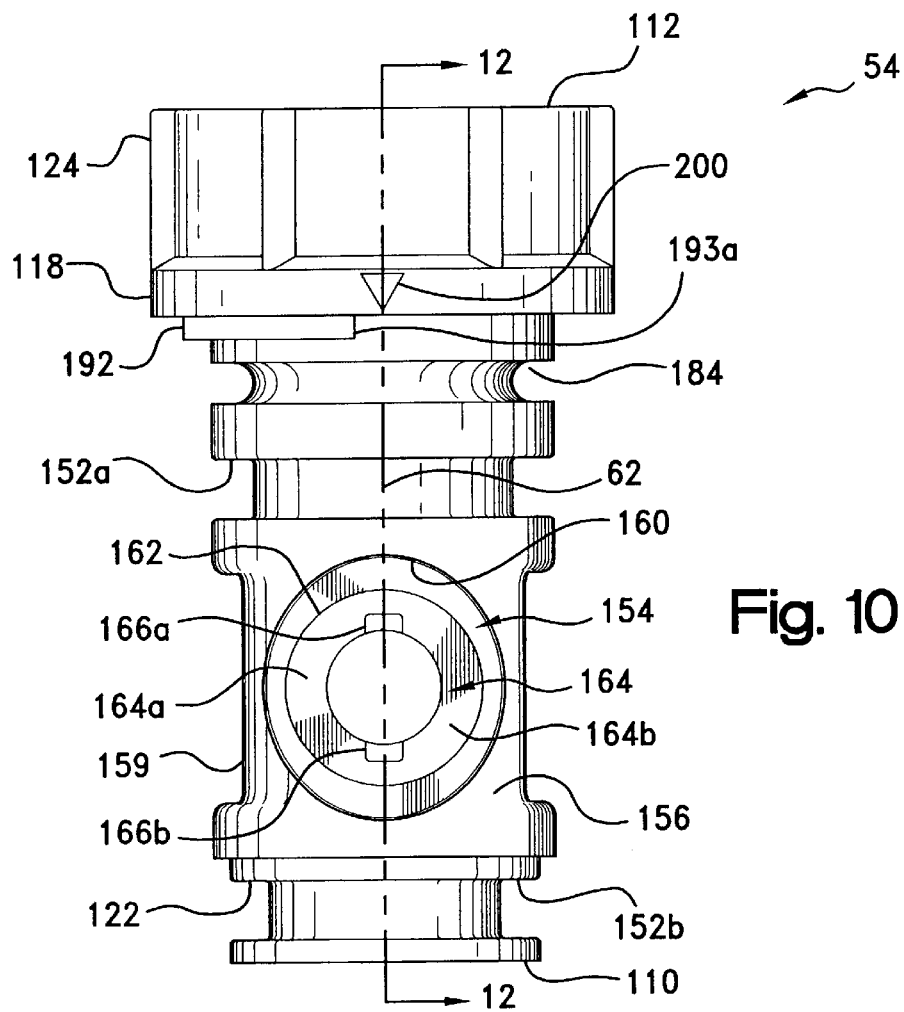
FIG. 10 is a front view of the plug of the valve assembly of FIG. 2.
Figure 12:
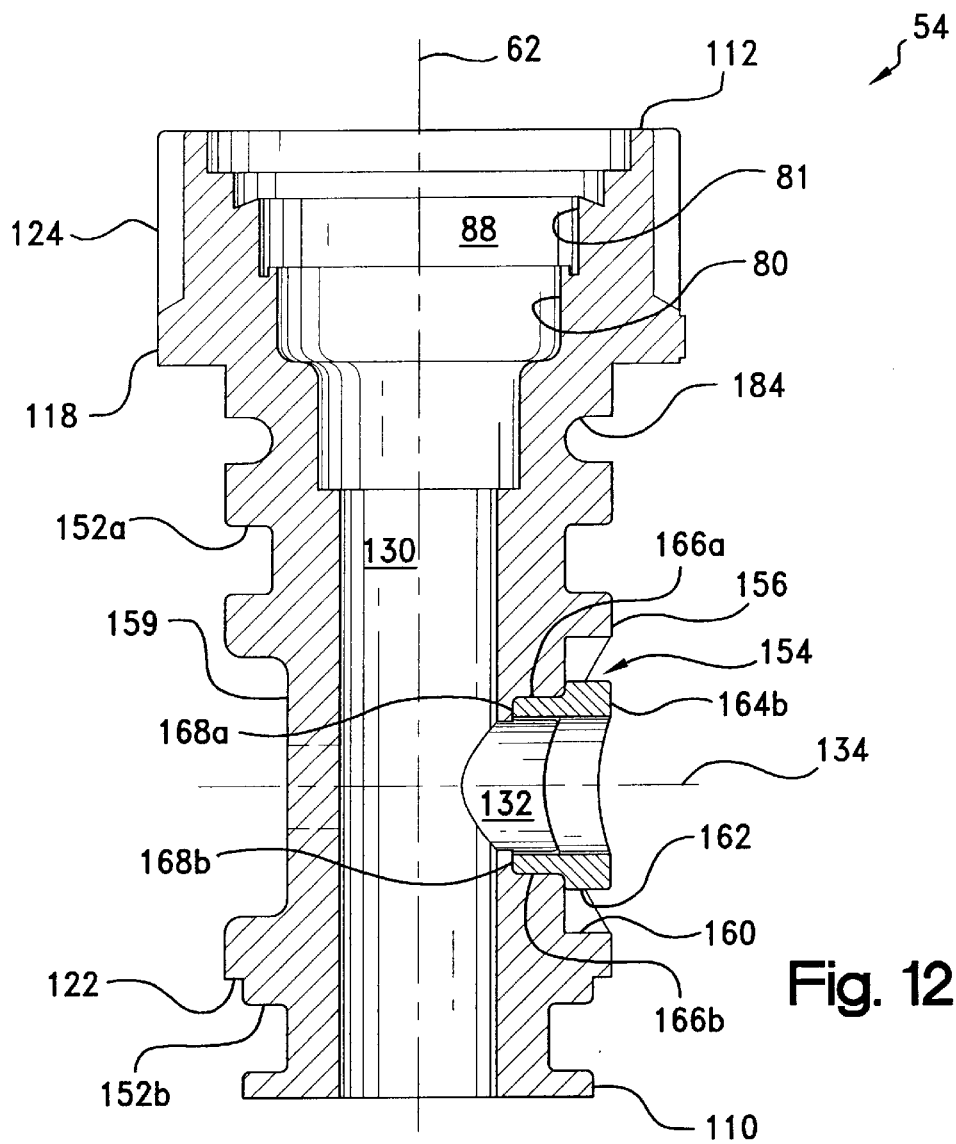
FIG. 12 is an axial cross-sectional view of the valve plug of FIG. 10 taken through line 12—12 of FIG. 10.

Turning next to the multi-view projections of FIGS. 10–12, and with continuing reference to the cross-sectional assembly view of FIG. 6, plug member 54 similarly may be seen to be molded, machined, or otherwise tubularly formed to extend coaxially with the body run portion 60 along first axis 62 from a first end, 110, to a second end, 112. As may be seen best in FIG. 6, plug first end 110 is received internally within body member 52 intermediate the first and third end openings 64 and 72. Plug second end 112, in turn, extends externally beyond the body second end opening 66 and is configured to define a third fluid port of the valve 50 which port is aligned coaxially with the first fluid port. In this regard, and with momentary reference to FIG. 9, body member 52 may be formed as having an internal end wall, 114, which serves as an internal stop and/or bearing for the plug first end 110, with the axial face, 116, of the body second end opening 66 serving as an external stop and/or bearing for an enlarged outer diameter boss portion, 118 (FIG. 10–12), of plug second end 112. Another internal stop or bearing may be provided via the mating of an internal step 120 of body member run portion 60 and a corresponding shoulder, 122, adjacent plug member first end 110. Plug second end 112 preferably is configured as a knurled, splined, or, as is shown at 124, vaned or other knob for the manual rotation of plug 54 within body 52 about axis 62.

For selectably directing fluid flow through valve 50, plug member 54 is provided as having a first fluid passageway, 130, formed therein coaxially with first axis 62 through the first and second plug ends 110 and 112. Depending upon the number of branches 68 of body 52, plug member 54 further is provided as having at least one second fluid passageway, 132, formed therein along a third axis, 134, which may be seen in the assembly view of FIG. 6 to be disposed generally perpendicular to the first axis 62 of body member 52.

As may be seen with continuing reference to FIG. 6, first fluid passageway 130 defines with the first and third fluid ports a first fluid flow path through valve 50 in the direction denoted by the arrows 140. In turn, second fluid passageway 132 communicates with the first fluid passageway 130 in defining with the first fluid flow path 140 and the second fluid port a second fluid flow path through valve 50 in the direction denoted by the arrows 142. It will be understood that the directions of the first and second fluid flow paths indicated, respectively, by the arrows 140 and 142 may be reversed depending upon the intended application for valve 50, and further that for a given application the first, second, and third fluid ports thereby may function within valve 50 as either fluid inlets or outlets.

As was the body end openings 64 and 72, the second end 112 of plug member 54 likewise may be formed for a push-in tubing connection as having an internal groove 80 into which is received an o-ring 82 (FIG. 6), and an adjoining step 81 into which is received an associated insert 86 (FIG. 6). With the insert 86, the plug second end 122 defines another internal gland 88 configured to coaxially receive the rearward end 89 of an associated collet member 58 for axial movement intermediate the forward and rearward positions of the collet. Advantageously, in the described push-in tubing connection, plug member 54 thereby is provided to be rotatable about the associated collet member 58 and any tubing end retained therein to accommodate the actuation of valve 50. As before, other end connections which may be of a push-in or other type may be employed without departing from the scope of the present invention.

With continuing reference to FIG. 6, plug member 54 itself may be sealed within body 52 via an upper and lower o-ring 150*a*–*b* received within corresponding upper and lower grooves, 152*a*–*b*, defined circumferentially about the plug. Second fluid passageway 132 is sealed for the on/off operation of valve 50 via another o-ring, 153, which is received within a corresponding annular groove or gland, 154. As may be seen with additional reference to FIGS. 10 and 12, gland 154 extends generally concentrically about the second passageway 132 as defined within an outer radial surface, 156, of plug 54 for compression against a confronting inner radial surface, 158, of the body run portion 60. Portions of the plug outer radial surface 156 may be recessed as shown at 159 in order to minimize part volume, weight, and material costs.

Figure 13:
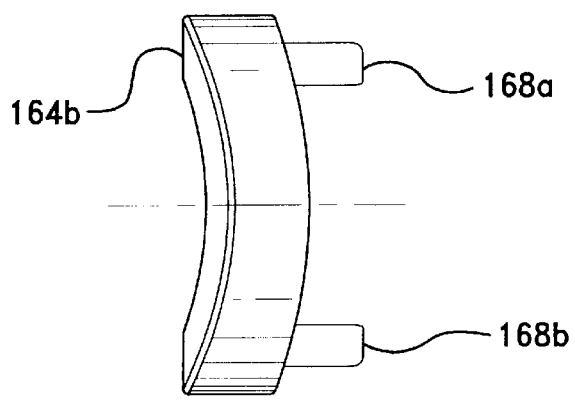
FIG. 13 is a perspective view of one of a pair of o-ring groove inserts for the valve plug of FIG. 10.

In a preferred arrangement, and as may be seen best in the front view of FIG. 10, gland 154 is defined as having an outer side wall, 160, of a generally elliptical geometry, and an inner side wall, 162, of a generally circular geometry such that the curvature of the gland 154 corresponds to the projection of o-ring 82 onto the generally cylindrical radial surface 156 of the plug 54. In this regard, the circular inner side wall 162 may be defined by a circular insert, 164, which is fitted into an axially spaced-apart pair of slots, referenced in phantom at 166*a*–in FIG. 10, formed into the outer radial surface 156 of the plug. Insert 164 may be provided as a pair of semicircular sections, 164*a*–*b*. Each of the sections 164*a*–*b* is formed, as may be seen in FIGS. 12 and 13 for section 164*b*, as having a pair of tangs, 168*a*–*b*, which may be configured for an interference, bonded, or other fit within a corresponding slot 166.

Returning to FIG. 6, and looking additionally to FIGS. 7 and 9, it may be seen that an opening, 170, is defined within body 52 intermediate the run and traverse portions 60 and 68 thereof for the second fluid flow path 142. Preferably, such opening 170 is formed as having a generally hyperbolic-shaped web, 172, extending thereacross. In this regard, as plug 54 is rotated about axis 62 and across the opening 170 for the opening and closing of the second flow path 142, o-ring 153 is compressibly retained its gland 154 against the web 172. Such retention minimizes any extrusion of the o-ring 153 into the opening 170 and thereby improves the service life of the o-ring which otherwise may be reduced as a result of wear against the peripheral edge of the opening 170. The hyperbolic shape of web 172 supports the o-ring while maximizing the available area open for fluid flow.

As assembled, and as may be seen in the assembly views of FIGS. 3, 4, and 6, fastening clip 56 secures the plug member 54 rotatably within the body member 52. Turning to the perspective view of FIG. 14, clip 56 may be seen in basic configuration to be of a unitary, generally C-shaped geometry including a retaining portion 180, which is configured to be insertably received coaxially about the plug member, and an abutment portion, 181. Retaining portion 180 is configured to define a distal pair of cantilevered segments or legs, 182*a*–*b*, each of which includes a proximal shoulder, 183*a*–*b*. With clip 56 being formed of a resilient polymeric material or the like, segments 182 thereby are provided to be expansible radially outwardly for enlarging inner periphery of the clip accommodating the insertion of retaining portion 180 over the outer diameter of the plug. As may be seen with momentary reference to FIGS. 10 and 12, plug 54 is formed as having a circumferential retaining groove, 184, configured to receive the clip 56.

With additional reference to FIGS. 7–9, it will be appreciated that clip 56 is insertable into groove 184 via a slot, referenced at 186 (in phantom in FIG. 8), which is formed through the wall of body run portion 60. Slot 186 is provided as having a given peripheral extent which is engagable by the abutment portion 181 of the clip 56 delimiting the axial removal of the plug member 54 from the body run portion 60. For delimiting the radial removal of the clip 56, body run portion 60 further is formed as having a pair of upstanding detent surfaces, 188*a*–*b*, each of which is engagable in a snap-fit arrangement by a corresponding shoulder 183 of clip 56. Advantageously, no tools are required for the assembling or disassembling valve 50 by virtue of the use of clip 56.

Returning to FIG. 4, in operation, the second or knob end 112 of plug member 54 is hand-accessible for rotating the plug in the opposing angular directions referenced at 190*a*–*b* between a first or fully opened and a second or fully closed setting. In the open setting, which is shown in FIG. 4, the axis 134 of the second fluid passageway 132 (FIG. 6) is aligned coaxially with the axis 70 of the body transverse portion 68 to open the second fluid flow path 142 to the second fluid port of the valve. In the closed setting, represented by the transposition of axis 134 at 134', the passageway is angularly displaced relative to the body axis 70 to close the second fluid flow path 142 by sealing the passageway against the internal surface 158 of the body. Optionally, intermediate settings may be defined been the fully open and fully closed settings wherein the second passageway is partially opened to the second fluid port such that the flow through the second flow path 142 is throttled. For all settings, constant flow is maintained through the first fluid flow path 140 (FIG. 6).

Preferably, the rotation of plug member 54 between the full opened and full closed settings is limited to a quarter, i.e., 90°, turn of the knob 112. In this regard, knob 112 may be formed as shown in FIGS. 4 and 10 as having a semicircular ring, 192, which extends 90° about the circumference of plug 54 intermediate a pair of upstanding end surfaces, one of which is referenced at 193a in FIG. 10. As may be seen with momentary reference to FIGS. 8 and 9, such ring 192 is configured to be received within a corresponding semicircular groove, 194, which is formed within the second end opening 66 of body 52 as extending 180° about axis 62. Each end of groove 194 terminates at a generally upstanding stop surface, referenced at 196a–b in FIG. 8, which confronts a corresponding end surface 193 of the plug ring 192. Accordingly, with reference again to FIG. 4, in the full open setting, the ring end surface 193a abuttably engages the groove stop surface 196a to delimit further angular displacement of the knob 112 in the direction 190a. In the full closed setting, the ring end surface 193b similarly abuttingly engages the groove stop surface 196b (not shown) to delimit further angular displacement of the knob 112 in the direction 190b.

Figure 5:
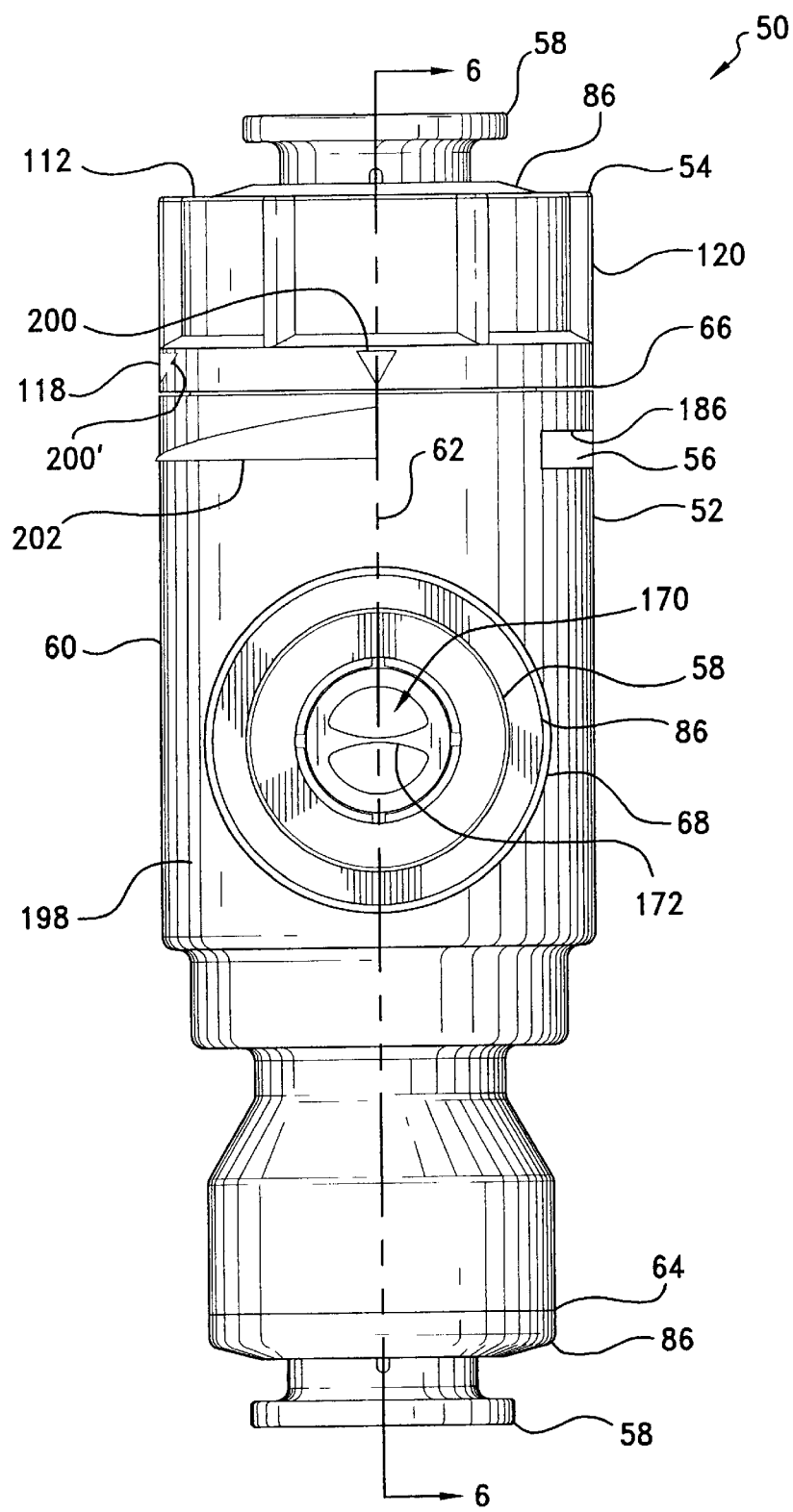
FIG. 5 is a front view of the valve assembly of FIG. 2.

As is shown best in FIGS. 2 and 5, the plug member second end 112 and an outer surface, 198, of body 52 each may be formed as having visually perceptible indicia for indicating the relative setting of the valve 50. In the illustrated arrangement, an arrow, 200, of the plug is disposed in an alignable orientation with a gradation continuum, 202, of the body. Thus, the fully open setting of valve 50 may be indicated by a first alignment of the indicia 200 and 202 shown in FIGS. 2 and 5, with the fully closed setting being indicated by a second alignment which is shown in phantom at 200', and the intermediate settings being indicated by the range between the first and second alignments.

Considering lastly the installation of valve 50 within a representative fluid circuit such as circuit 10 of FIG. 1, connection 30 thereof reappears at 30' in FIG. 15. In the connection 30', the first and third fluid ports, referenced at 204 and 206, respectively, of valve 50 each is coupled to the cold supply line 22b via a push-in connection, with the third fluid port, referenced at 208, being coupled to the branch line 28 also via a push-in connection. With lines 22b and 28 being provided as plastic or metal tubing, the push-in connections may be effected directly. In retrofit applications, a section of the tubing 22b may be removed to accommodate the length of the valve. For hose connections, a conventional tubing to threaded connector may be employed for added versatility. Prior to the connection of the third fluid port 208, and with ports 204 and 206 being connected to line 22b, the valve body 52 advantageously is rotatable 360° in the angular directions referenced by arrows 210a–b to facilitate the alignment of the branch portion 68 thereof with the tube 28. Once installed, the plug knob 112 is rotatable about the tube 22b for the setting of the valve 50.

Thus, a unique in-line diversion valve construction is described which is economical to manufacture and which provides reliable operation while minimizing the envelope size of the valve for easier installation.

Depending upon its material of construction, the valve assembly of the present invention are may be fabricated by molding, forging, machining, or other conventional forming processes. Unless otherwise specified, materials of construction are to be considered conventional for the uses involved. Such materials generally will be corrosion resistant and otherwise selected for compatibility with the fluid being transferred or for desired mechanical properties. Preferred materials of construction for the clip, plug, and body members includes plastics and other polymeric materials, as well as ferrous or nonferrous metals such as mild steel, stainless steel, and brass. Preferred plastic materials include poly (ether ether ketones), polyimides, high molecular weight polyethylenes, polyetherimides, polybutylene terephthalates, nylons, fluoropolymers, polysulfones, and polyesters, with polyethylene terephthalate, acetal homo and copolymers, polyvinyl chloride and, particularly, polypropylene being preferred for potable water applications. Preferred materials for the valve seals include thermoplastic or thermosetting natural or synthetic or rubbers such as fluorocarbon, SBR, polybutadiene, EPDM, butyl, neoprene, nitrile, polyisoprene, silicone, fluorosilicone, buna-N, and copolymer rubbers, with a blend such as ethylene-propylene rubber being preferred for potable water applications.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A valve assembly for directing fluid flow therethrough comprising:

a body having a generally-annular run portion which extends axially along a first axis from a first end opening configured to define a first fluid port of said valve assembly to a second end opening, and at least one generally-annular transverse portion which extends radially from said run portion intermediate said first and said second end opening along a second axis disposed generally perpendicular to said first axis to a third end opening configured to define a second fluid port of said valve assembly; and a generally cylindrical plug member extending coaxially with the run portion of said body along said first axis from a first end received internally within said body intermediate said first and said third end opening thereof to a second end extending externally beyond the body second end opening and configured to define a third fluid port of said valve assembly aligned coaxially with said first fluid port and adapted for connection with a distal tube end, said plug member being rotatable within said body about said first axis and the tube end when said tube end is connected to said third fluid port, and having a first fluid passageway formed therein coaxially with said first axis through said first and said second end which first fluid passageway defines with said first and said third fluid port a first fluid flow path through said valve assembly, and said plug member having at least one second fluid passageway formed therein along a third axis disposed generally perpendicular to said first axis which second fluid passageway communicates with said first fluid passageway and defines with said first fluid flow path and said second fluid port a second fluid flow path through said valve assembly, said second end of said plug member being hand-accessible for rotating said plug between a first angular position wherein said third axis of said second fluid passageway is aligned coaxially with said second axis of said body transverse portion to open said second fluid flow path, and a second angular position wherein said third axis is angularly displaced relative to said second axis to close said second fluid flow path.

2. The valve assembly of claim 1 wherein said third fluid port is adapted for a releasable said connection with said distal tube end as being configured as having an internal gland defined within the second end of said plug member coaxially with said first fluid passageway, said valve assembly further comprising at least one annular collet member which extends coaxially with said first axis from an internal end journaled within said gland to an external end, said collet member being slidably movable within the gland intermediate a rearward position and a forward position spaced-apart axially from the rearward position, the rearward position accommodating a radial outward expansion of said collet member for the insertion and removal of the tube end therethrough, and the forward position effecting a radially inward contraction of said collet member about the tube end delimiting the removal thereof from said collet member, said plug member being provided to be rotatable about said collet member and the first distal tube end when the tube end is connected to said second fluid port by said collet member.

3. The valve assembly of claim 2 wherein one or both said first and said second fluid port is adapted for a releasable connection with a corresponding said distal tube end as being configured as having a said internal gland defined within, respectively, said first and said third end opening of said body coaxially with, respectively, said first and said second fluid passageway, each said internal gland defined within said body first and said third end opening receiving a said collet member.

4. The valve assembly of claim 1 wherein one or both said first and said second fluid port is adapted for a releasable connection with a corresponding distal tube end as being configured as having an internal gland defined within, respectively, said first and said third end opening of said body coaxially with, respectively, said first and said second fluid passageway, said valve assembly further comprising one or more annular collet members each of which extends coaxially with said first or said axis from an internal end journaled within a corresponding said gland to an external end, each said collet member being slidably movable within each said corresponding gland intermediate a rearward position and a forward position spaced-apart axially from the rearward position, the rearward position accommodating a radial outward expansion of the collet member for the insertion and removal of the tube end therethrough, and the forward position effecting a radially inward contraction of the collet member about the tube end delimiting the removal thereof from the collet.

5. The valve assembly of claim 1 wherein said plug member is formed as having an outer radial surface including a circumferential groove, and wherein said body run portion is formed as having a slot of a given peripheral extent disposed in registration with said plug member groove, said valve assembly further comprising a fastening member for retaining said plug member within said body run portion, said fastening member including an inward clip portion inserted through said slot into retention within said plug member groove, and an outward abutment portion engagable with the peripheral extent of said slot delimiting the axial removal of said plug member from said body run portion.

6. The valve assembly of claim 5 wherein said clip portion of said fastening member is configured as a having at least one radially-outwardly extending shoulder and wherein said body run portion is formed as having at least one detent surface engagable with said shoulder for delimiting the radial removal of said fastening member from said slot.

7. The valve assembly of claim 1 wherein the second end opening of said body run portion is formed as having a semicircular groove extending radially about said first axis intermediate a first and a second stop surface, and wherein said plug member second end is formed as having a semicircular ring with extends radially about the circumference thereof intermediate a first and a second end surface, said ring being slidably received within said groove such that in said first angular position of said plug member, one said end surface of said ring abuttably engages one said stop surface of said groove delimiting the angular displacement of said plug in a first angular direction, and wherein in said second angular position the other said end surface of said ring abuttably engages the other said stop surface of said groove delimiting the angular displacement of said plug in a second angular direction opposite said first angular direction.

8. The valve assembly of claim 7 wherein said plug member second end is configured as a knob including first indicia, and wherein said body is formed as having an outer surface including second indicia, said first indicia being disposed in a first visually-perceptible indicating alignment with said second indicia when said plug is disposed in said first angular position, and in a second visually-perceptible indicating alignment with said second indicia when said plug is disposed in said second angular position.

9. The valve assembly of claim 1 further wherein said plug member has an outer radial surface including an annular groove defined therein generally concentrically about the second fluid passageway, and wherein said body run portion has an inner radial surface disposed opposite the inner radial surface of said plug member, said valve assembly further comprising an annular seal member received within said groove and compressible against said inner radial surface of said body run portion to effect a fluid tight sealing of said second fluid passageway.

10. The valve assembly of claim 9 wherein said groove is defined within said plug member as having an outer side wall of a generally elliptical geometry and an inner side wall of a generally circular geometry.

11. The valve assembly of claim 10 wherein said inner side wall is defined by a generally circular insert which is fitted into said plug member.

12. The valve assembly of claim 9 wherein said body is formed as having a generally hyperbolic-shaped web which extends radially across said second fluid flow path intermediate said run portion and said transverse portion, said seal member being compressibly retained within said groove against said web as said plug member is rotated between said first and said angular second position.

13. A valve assembly for directing fluid flow therethrough comprising:

a body having a generally-annular run portion which extends axially along a first axis from a first end opening configured to define a first fluid port of said valve assembly to a second end opening, and at least one generally-annular transverse portion which extends radially from said run portion intermediate said first and said second end opening along a second axis disposed generally perpendicular to said first axis to a third end opening configured to define a second fluid port of said valve assembly, said body run portion being formed as having a slot of a given peripheral extent;

a generally cylindrical plug member extending coaxially with the run portion of said body along said first axis from a first end received internally within said body intermediate said first and said third end opening thereof to a second end extending externally beyond the body second end opening and configured to define a third fluid port of said valve assembly aligned coaxially with said first fluid port, said plug member being formed as having an outer radial surface including a circumferential groove disposed in registration with said body run portion slot, and being rotatable within said body about said first axis and having a first fluid passageway formed therein coaxially with said first axis through said first and said second end which first fluid passageway defines with said first and said third fluid port a first fluid flow path through said valve assembly, and said plug member having at least one second fluid passageway formed therein along a third axis disposed generally perpendicular to said first axis which second fluid passageway communicates with said first fluid passageway and defines with said first fluid flow path and said second fluid port a second fluid flow path through said valve assembly, said second end of said plug member being hand-accessible for rotating said plug between a first angular position wherein said third axis of said second fluid passageway is aligned coaxially with said second axis of said body transverse portion to open said second fluid flow path, and a second angular position wherein said third axis is angularly displaced relative to said second axis to close said second fluid flow path; and a fastening member for retaining said plug member within said body run portion, said fastening member including an inward clip portion inserted through said body run portion slot into retention within said plug member groove, and an outward abutment portion engagable with the peripheral extent of said slot delimiting the axial removal of said plug member from said body run portion.

14. A valve assembly for directing fluid flow therethrough comprising:

a body having a generally-annular run portion which extends axially along a first axis from a first end opening configured to define a first fluid port of said valve assembly to a second end opening, and at least one generally-annular transverse portion which extends radially from said run portion intermediate said first and said second end opening along a second axis disposed generally perpendicular to said first axis to a third end opening configured to define a second fluid port of said valve assembly, said body run portion having an inner radial surface, and said body being formed as having a generally hyperbolic-shaped web which extends radially across said second fluid flow path intermediate said run portion and said transverse portion;

a generally cylindrical plug member extending coaxially with the run portion of said body along said first axis from a first end received internally within said body intermediate said first and said third end opening thereof to a second end extending externally beyond the body second end opening and configured to define a third fluid port of said valve assembly aligned coaxially with said first fluid port, said plug member being rotatable within said body about said first axis and having a first fluid passageway formed therein coaxially with said first axis through said first and said second end which first fluid passageway defines with said first and said third fluid port a first fluid flow path through said valve assembly, and said plug member having at least one second fluid passageway formed therein along a third axis disposed generally perpendicular to said first axis which second fluid passageway communicates with said first fluid passageway and defines with said first fluid flow path and said second fluid port a second fluid flow path through said valve assembly, said plug member having an outer radial surface disposed opposite the inner radial surface of said body run portion and including an annular groove defined therein generally concentrically about the second fluid passageway, and said second end of said plug member being hand-accessible for rotating said plug between a first angular position wherein said third axis of said second fluid passageway is aligned coaxially with said second axis of said body transverse portion to open said second fluid flow path, and a second angular position wherein said third axis is angularly displaced relative to said second axis to close said second fluid flow path; and an annular seal member received within said groove and compressible against said inner radial surface of said body run portion to effect a fluid tight sealing of said second fluid passageway, said seal member being compressibly retained within said groove against said web as said plug member is rotated between said first and said angular second position.

* * * * *